United States Patent [19]
Tahara

[11] 3,820,796
[45] June 28, 1974

[54] TWO-CHANNEL AND FOUR-CHANNEL AUTO-SELECTOR DEVICE FOR CARTRIDGE-TYPE TAPE PLAYERS

[75] Inventor: Kumeo Tahara, Iwaki, Japan

[73] Assignee: Alps Motorola, Inc., Tokyo, Japan

[22] Filed: Sept. 29, 1972

[21] Appl. No.: 293,553

[52] U.S. Cl. .................................... 360/94
[51] Int. Cl. G11b 21/12, G11b 15/12, G11b 21/08
[58] Field of Search .................... 274/4 G, 4 A, 4 B; 179/100.2 Z

[56] References Cited
UNITED STATES PATENTS
3,730,532 5/1973 Miyamoto .......................... 274/4 G

*Primary Examiner*—Harry N. Haroian
*Attorney, Agent, or Firm*—Mueller, Aichele & Ptak

[57] ABSTRACT

This invention relates to a two-channel and four-channel auto-selector device for a cartridge-type tape player, that is, to a device which selects and actuates a two-channel circuit or a four-channel circuit in a tape player in response to detection of the type of tape cartridge inserted in the player, as to whether it is the two-channel type or the four-channel type. The player has an auto-selector device which is responsive to the physical characteristic of the cartridge inserted therein to operate a mode selector switch rather than having the cartridge operate the mode selector switch directly.

6 Claims, 8 Drawing Figures

TWO-CHANNEL AND FOUR-CHANNEL AUTO-SELECTOR DEVICE FOR CARTRIDGE-TYPE TAPE PLAYERS

BACKGROUND OF THE INVENTION

Tape players have been proposed wherein the mode selector switch is directly operated by the cartridge when it is inserted in the player to set the player for either two-channel or four-channel operation, but this type of construction subjects the cartridge to unnecessary large force upon insertion to operate the switch and thus, it had the drawback that the foregoing large force which was required influenced the magnetic tape contained in the cartridge when pressed to the capstan shaft to produce mechanical strain therein resulting in "wow and flutter." Another system was also known in which relays were employed responsive to insertion and removal of the cartridge to actuate a solenoid, in turn, to control an operation rod of a selector switch; but it had the drawbacks that the employed relays caused "chattering" and needed continued supply of electric power during tape playing, resulting in a waste of electric power.

SUMMARY OF THE INVENTION

It is an object of this invention to provide an improved auto-selector switch for a two-channel and four-channel cartridge-type tape player wherein the force required to insert the cartridge into the player is of a magnitude to reduce the possibility of "wow and flutter" being introduced into the playback of the tape in the cartridge.

It is another object of this invention to provide an improved and relatively inexpensive auto-selector switch for a two-channel and four-channel cartridge-type tape player wherein power for operating the switch is conserved and player noise is greatly reduced.

In one embodiment of this invention a cartridge-type tape player capable of playing two-channel and four-channel tape cartridges utilizes a locked, spring loaded mode selector switch. In one instance when the cartridge is inserted into the player it either strikes or misses a cam device depending on the physical characteristic of the cartridge. If it strikes the cam it operates the same with a minimum of force to unlock the mode selector switch to set the player to playback the cartridge. In another instance, the cartridge, upon insertion into the player, either closes an electrical switch or not depending on the physical characteristics of the cartridge. If the switch is closed it provides a momentary pulse to a solenoid which is actuated to unlock the mode selector switch to set the player to playback the cartridge. In those cases where the cartridge is inserted and its physical characteristics are such that it neither strikes the cam in the first instance nor closes the switch in the second instance, the mode selector switch in the locked position is set to playback the cartridge.

DETAILED DESCRIPTION

Figure 1:
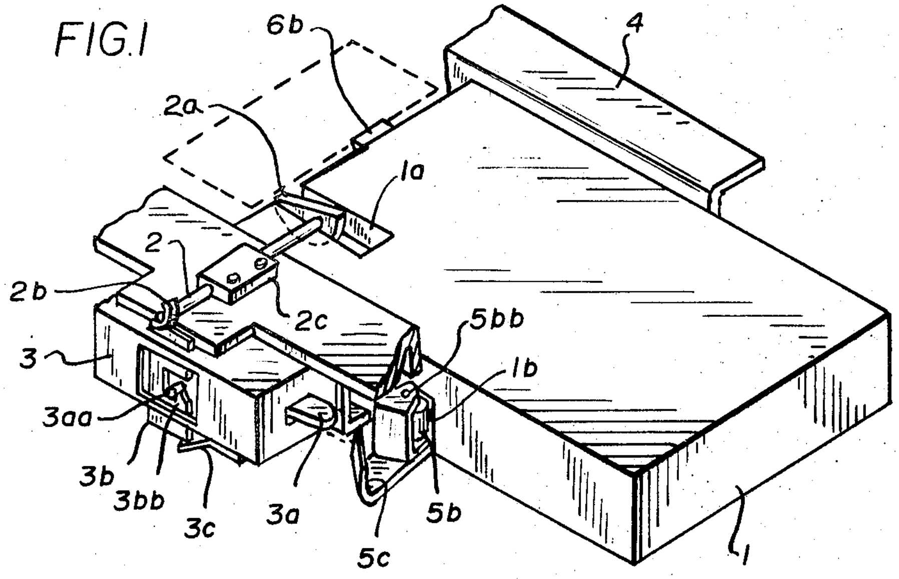
FIG. 1 is a perspective view of an auto-selector switch for a two-channel and four-channel cartridge-type tape player in accordance with this invention.

Referring to the drawings, 1 is a cartridge, 2 is an interlocking rod, 3 is a selector switch, **1*a* is a recess formed in a four-channel cartridge, 2*a* is a cam of the interlocking rod 2 disposed as to correspond in position to the location of the above recess, and 2*b* is another cam of the interlocking rod 2 abutting upon a locking plate 3*b* of the selector switch 3, wherein the cams 2*a* and 2*b* cooperate with one another. 3*a* is an operation rod of the selector switch which performs a slide movement. The locking plate 3*b* is normally urged upward as viewed in the drawing by a spring 3*c* fixed to a frame of the selector switch 3, and its coupling portion 3*bb* is coupled to a locked member 3*aa*, such as a lock pin, which is fixed to the operation rod 3*a* and projects through a window formed in the frame 3 of the selector switch. 4 is a tape player body, but only a cartridge 1 insertion opening portion is illustrated. In an actual arrangement, a set of rotary shafts for feeding a tape, magnetic head, and the like may be disposed and arranged so as to face directly the inserted cartridge (along the broken line in the drawing). The interlocking rod 2 is mounted by means of its support member 2*c* to the body 4**, but the selector switch is mounted directly on the same.

Figure 2:
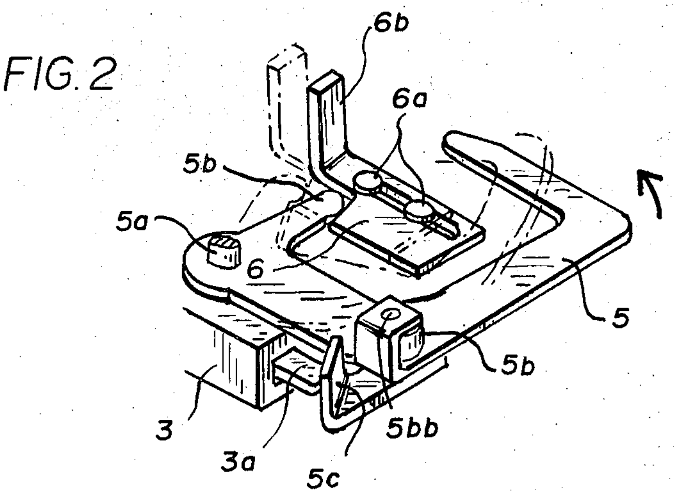
FIG. 2 is a perspective view of a portion of the switch of FIG. 1 in accordance with this invention.

Reference numeral 5 is a C-shaped lever for holding the cartridge 1 mounted rotatably to the body 4 through a post **5*a* (see FIG. 2), 5*b* is a roll mounted rotatably to the C-shaped lever 5 through a post 5*bb*, 5*c* is a control piece for the operation rod 3*a* of the selector switch 3 secured to the C-shaped lever 5, 6 is a slider body disposed on the body 4 and slidable by means of posts 6*a* and 6*b* is a stop piece for the cartridge 1 (see FIGS. 1 and 2**).

In explaining the operation of this embodiment, FIG. 2 shows the position where the cartridge is not yet inserted. In this position, normally, the control piece **5*c* urges the operation rod 3*a* to the position shown in FIG. 1, and the locked member 3*aa* is coupled with the coupling portion 3*bb*. Then, as the cartridge 1 is inserted in the body 4, the cartridge 1 abuts upon the stop piece 6*b* of the slider body 6 to push the same with the slider body 6 sliding in conjunction with end portion 5*a* of the C-shaped lever 5. At the time when insertion of the cartridge 1 is completed, the C-shaped lever 5 rotates quickly in the arrow direction as viewed in FIG. 2 by the action of a reversing spring (not shown). At this time, the roll 5*b* fits vigorously and impetuously in the recess 1*b* of the cartridge 1 to thereby hold the cartridge 1 in the body 4. The aforedescribed state is as shown in FIG. 1; in this position then the slider body 6 and the C-shaped lever 5 move to the positions shown in broken lines in FIG. 2, and the control piece 5*c* moves to the position shown in FIG. 1 so that it is spaced from the locked operation rod 3*a* a distance longer than the span through which the operation rod $3a$ returns by means of urging of the spring contained in the selector switch 3** when the operation rod $3a$ is unlocked.

If the cartridge 1 is the four-channel type (such one as shown in FIG. 1), since it is formed with the recess $1a$, the cam $2a$ engages in that recess $1a$ and the interlocking rod 2 does not rotate. Thus, the cam $2b$ also does not rotate, so that the locking plate $3b$ is not pushed whereby the operation rod $3a$ is maintained in the locked position.

In the above position (that is in case the operation rod $3a$ is pushed and locked), the selector switch 3 selects the four-channel mode of the reproducing and/or recording network provided in or connected to the tape player body. If the cartridge 1 is the two-channel type, that is, if it has no recess $1a$, the cam $2a$ is rotated by the cartridge 1 as to depart therefrom and the interlocking rod 2 rotates also to push the locking plate $3b$ through the cam $2b$ to thereby unlock the locked member $3aa$, whereby the operation rod $3a$ returns to the broken line position in FIG. 1 and the selector switch 3 selects the two-channel mode of the aforementioned network.

In short, in the instant device if the cartridge is not yet inserted, the player is set to normally select the four-channel mode of the reproducing and/or recording network of the tape player and, when the cartridge 1 is inserted, the player is switched to the two-channel mode or is not altered depending upon whether the inserted cartridge is the two-channel type or the four-channel type.

Further, in the device according to the invention, since the force is applied to the locking plate in place of the operation rod of the selector switch, the resulting reaction which the cartridge 1 receives can be reduced extremely in comparison with the prior system and there is not need to enlarge the force to be applied in inserting and ejecting the cartridge 1. Thus, the influence on the device due to any force which may be generated when the cartridge 1 is handled to switch over the selector switch can be substantially eliminated resulting in no generation of "wow" whereby very efficient devices of the above type can be produced.

Figure 3A:
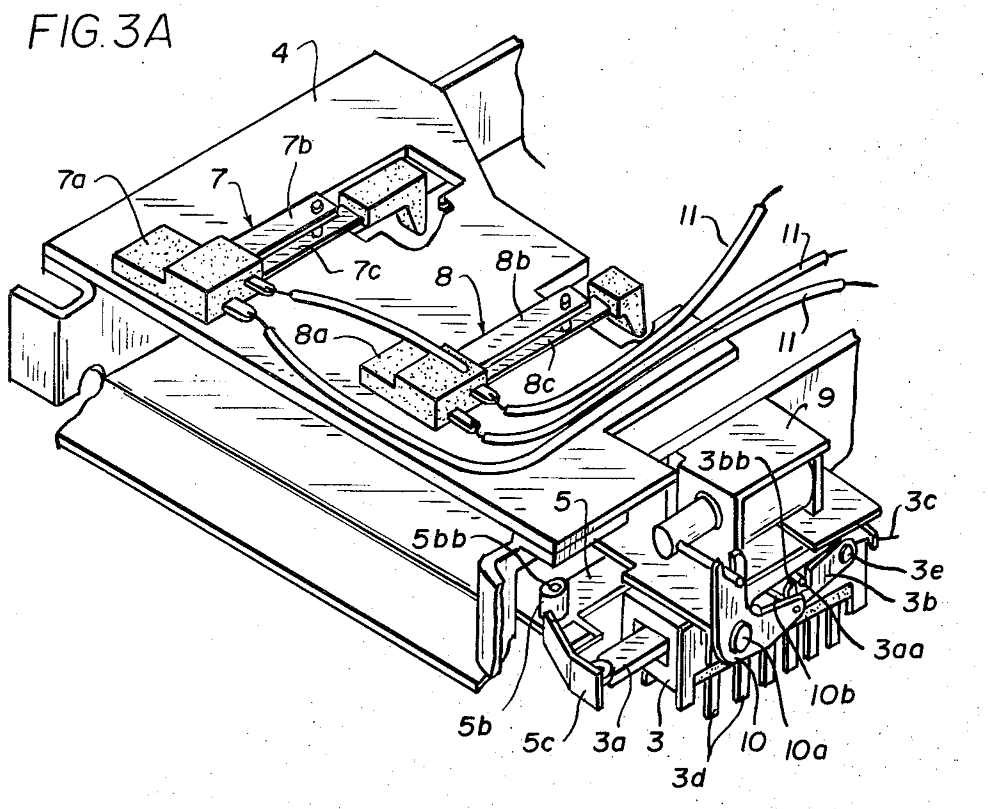
FIGS. 3A, 3B, and 3C are a perspective view and a schematic view of a further embodiment of an auto-selector switch for a two-channel and four-channel cartridge-type tape player in accordance with this invention.
Figure 3B:
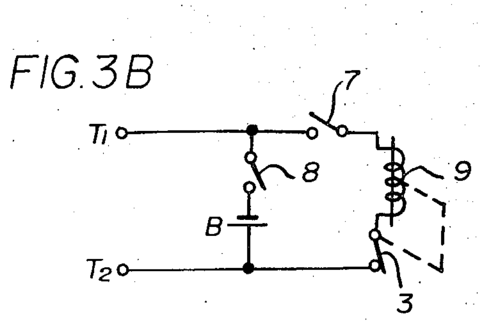
Figure 3C:
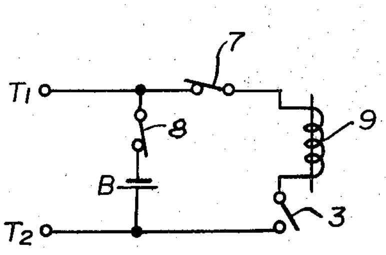
Figure 4:
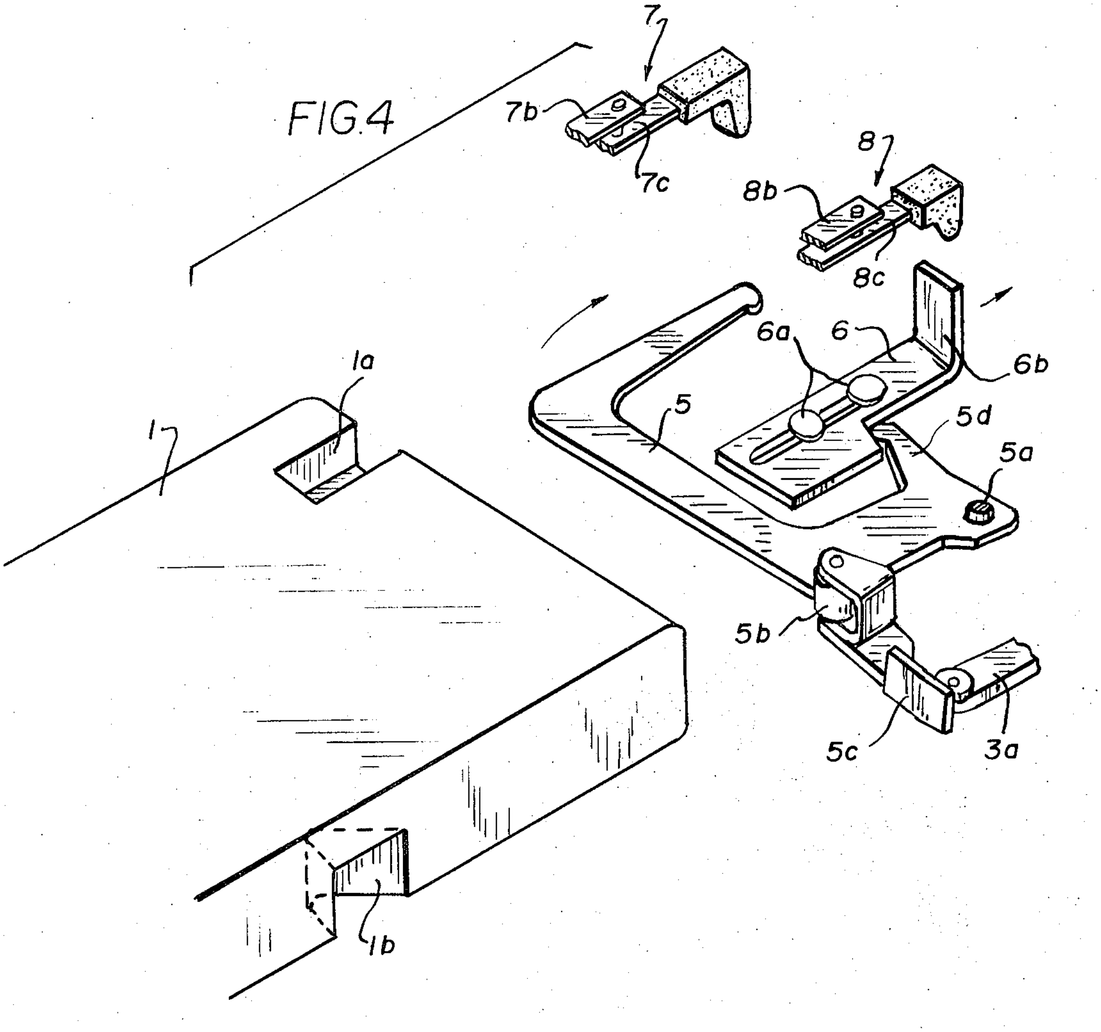
FIG. 4 is an exploded view in perspective of a portion of the switch of FIG. 3A in accordance with this invention.

FIGS. 3 through 5 show a second embodiment; first the arrangement and parts except for the parts corresponding to those included in the first embodiment (bearing the same reference characters) will be explained. 7 is a response switch for channel selection in which leaf contact pieces $7b$ and $7c$ are secured by a support portion $7a$ to the body 4. 8 is a response switch for a power source where leaf contact pieces $8b$ and $8c$ are secured by a support portion $8a$ to the body 4. 9 is a solenoid for channel selection secured to the body 4 wherein a projecting piece $9a$ provided on a movable core engages with one end of a swingable lever 10 mounted rotatably by means of a post $10a$ to the body 4. $10b$ is a pin fixed to the other end of the swingable lever 10 and engages with the pointed end of the locking plate $3b$ of the channel selector switch 3.

Reference numerals 11, 11 and 11 are lead wires which are wired to the response switches 7 and 8 and the solenoid 9 and connect them to the reproducing and/or recording network of the tape player where, as shown in FIG. 3B, the response switch 8 is connected in series with the tape player power source B, the response switch 7 and the solenoid 9 are connected in parallel with terminals $T_1$ and $T_2$ relative to the power source B, and the terminals $T_1$ and $T_2$ are connected to the reproducing and/or recording network of the tape player.

Reference numeral 3 is the channel selector switch, but in this embodiment one appropriate pair of plural switching terminal pairs $3d$ may be used. It should be noted that in this embodiment the C-shaped lever 5 and the slider body 6 are disposed as shown in FIG. 4 in connection with the response switches 7 and 8 (while in FIG. 3A they seem to be disposed below the body 4). Further, in this embodiment, the locking plate $3b$ is mounted rotatably by the post $3e$ to the frame of the channel selector switch 3 and applied by the spring $3c$ with the upward rotating force, as viewed in the drawing.

Now the operation of this embodiment will be described; where the cartridge 1 is not yet inserted, the device assumes the position shown in FIG. 3A and the response switches 7 and 8 are in the OFF state. The operation rod $3a$ of the channel selector switch 3 is depressed by the control piece $5c$ of the C-shaped lever 5, the locked member $3aa$ is engaged by the coupling portion $3bb$ of the locking plate $3b$, and the channel selector switch 3 is selecting the four-channel mode circuit. In this position, the circuit connected to the lead wires 11 assumes the position shown in FIG. 3B so that current does not flow through the solenoid 9, the movable core is not attracted, and thus the projecting piece $9a$ is stationary. Also, in the drawing, an appropriate switching terminal pair $3a$ now employed of the channel selector switch 3 is ON.

Then, if the cartridge 1 (shown in FIG. 5A) of the two-channel type is inserted, the slider body 6 is pushed in the arrow direction as viewed in FIG. 4 and at the same time the C-shaped lever 5 is rotated in the arrow direction so that the contact piece $5c$ is spacd from the operation rod $3a$ a distance longer than the switchover span of the operation rod $3a$ and the roll $5b$ fits in the recess $1b$ of the cartridge 1 vigorously and impetuously to thereby hold the cartridge in the body 4. Since the two-channel type cartridge 1 does not have a recess $1a$, the leaf contact pieces $7c$ and $8c$ of the response switches 7 and 8 are moved away by the cartridge 1 so that the leaf contact pieces $7b$ and $7c$ and the leaf contact pieces $8b$ and $8c$ come in contact with one another at their contact points; thus the response switches 7 and 8 become ON. At the moment when the response switches 7 and 8 turn ON, current flows through the solenoid 9, the moveable core is attracted, the projecting piece $9a$ provided on the movable core rotates the swingable lever 10 in the arrow direction as viewed in FIG. 5B. In response thereto, the pin $10b$ engages the pointed end of the locking plate $3b$ causing the locking plate $3b$ to rotate about the post $3e$ to thereby unlock the locked member $3aa$ of the operation rod $3a$. Thus, the operation rod $3a$ moves to the position shown in the broken line in FIG. 5A, so that the channel selector switch 3 selects the two-channel mode of the reproducing and/or recording network of the tape player. At the same time, the switch 3 shown in FIG. 3B which is a part of the channel selector switch 3 turns OFF, so that current to the solenoid 9 is shut off even when the response switches 7 and 8 are kept ON as viewed in FIG. 3C. That is, power supplied to the solenoid 9 which is not needed after changeover of the channels is terminated to stop the consumption of unneeded electric power.

When the four-channel cartridge 1 (shown in FIG. 4) is inserted, since the leaf contact piece 7*c* of the response switch 7 is located in the recess 1*a* and stands still, only the response switch 8 turns ON, while the response switch 7 is held OFF. Accordingly, the solenoid 9 does not operate and the playing of the cartridge 1 is initiated upon supply of electric power with the channel selector switch 3 in the four-channel mode.

In either case, while the response switch 8 is ON, that is, the cartridge 1 is inserted, current is passing through one mode of the reproducing and/or recording network selected by the channel selector switch 3.

Figure 5A:
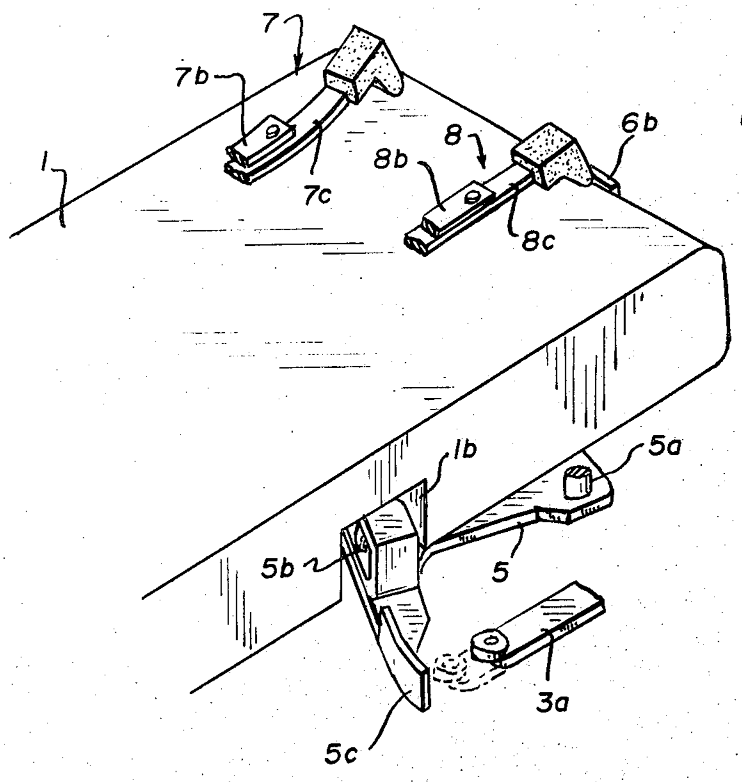
FIGS. 5A and 5B are further perspective views of the switch of FIG. 3A in accordance with this invention.
Figure 5B:
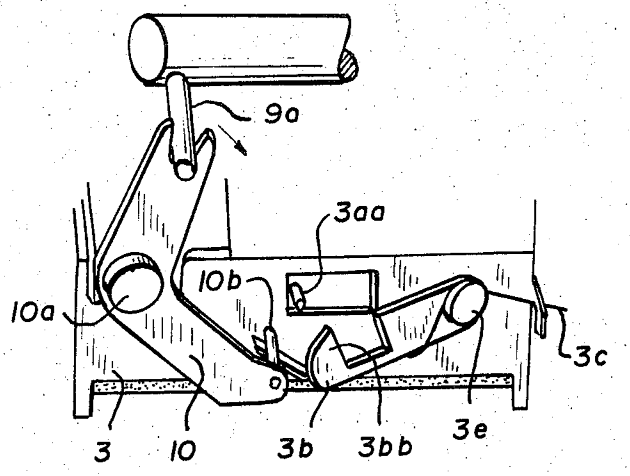

In case the two-channel cartridge has been inserted, if it is removed, the operation rod 3*a* returns to the solid line position shown in FIG. 5A whereby the channel selector switch 3 selects automatically the four-channel mode. In other words, where the cartridge is not inserted, the channel selector switch 3 is always on the four-channel mode, whereas only when the two-channel cartridge is inserted does the switch 3 automatically change over to the two-channel mode.

The two-channel and four-channel auto-selector device for the cartridge-type tape player according to the instant invention has many advantages in that it does not create unnecessarily large load to the mechanism upon insertion and removal of the cartridge 1; it minimizes mechanical strain influencing on the magnetic tape; it does not employ conventional relays which are very expensive and have various well-known drawbacks; it prevents occurrence of "wow"; it consumes little electric power because it utilizes only a momentary power pulse to the solenoid, whereby the instant invention can provide reliable channel changeover operation at low costs in comparison with prior systems.

Though in the embodiments both the interlocking rod 2 and swingable lever 10 were described to be rotatable, it should be noted that the instant invention can be modified in any ways with respect to the structure or arrangement on the basis of the spirit and scope of the invention as set forth.

I claim:

1. In a cartridge-type tape player for playing and/or recording first and second kinds of cartridges having tapes with different numbers of programs thereon, the number of such programs in each cartridge being indicated by a code portion on the cartridge, the player further including latching means operable to a first portion upon insertion of a cartridge into the player to hold the cartridge in the play position and to a second position to release the cartridge for removal from the player, the improvement including in combination, a mode selector switch having a first position for operating the player to play the first kind of cartridge and being movable to a second position for operating the player to play the second kind of cartridge, means responsive to the coded portion on the first kind of cartridge with the same being inserted into the tape player to maintain said mode selector switch in said first position for playing the cartridge, said means further being responsive to the coded portion on the second kind of cartridge with the same being inserted into the player to move said mode selector switch to said second position for playing the second kind of cartridge, and linkage means being responsive to the latching means being operated to the second position to release the cartridge to operate said mode selector switch to said first position, whereby with no cartridge in the player said mode selector switch is always set to play the cartridge of the first type.

2. The cartridge-type tape player of claim 1 wherein said mode selector switch includes a spring loaded operating rod and locking means locking said rod against said spring pressure to set said mode selector switch in said first position, the player further including cam means coupled to said locking means, said cam means being responsive to the coded portion of the first kind of cartridge being inserted into the player to maintain said mode selector switch in said first position for playing the first kind of cartridge, said cam means further being responsive to the coded portion of the second kind of cartridge to operate said locking means to release said spring loaded rod to operate said mode selector switch to said second position for playing the second kind of cartridge.

3. The cartridge-type tape player of claim 2 wherein said linkage means includes an arm connected to the latching means and with the latching means being operated to the second position to release the cartridge with the second kind of cartridge being in the player, said arm engages said operating rod and moves the same against said spring pressure until said locking means locks said operating rod against said spring pressure to set said mode selector switch in said first position.

4. The cartridge-type tape player of claim 1 wherein said mode selector switch includes a spring loaded operating rod and locking means locking said rod against said spring pressure to set said mode selector switch in said first position for playing the first kind of cartridge, the player further including a solenoid having an armature coupled to said locking means, and switch means being responsive to the coded portion of the first kind of cartridge being inserted into the player to maintain said mode selector switch in said first position for playing the first kind of cartridge, said switch means further being reponsive to the coded portion of the second kind of cartridge to energize said solenoid whereby said armature operates said locking means to release said spring loaded rod to operate said mode selector switch to said second position for playing the second kind of cartridge.

5. The cartridge-type tape player of claim 4 wherein said linkage means includes an arm connected to the latching means, and with the latching means being operating to the second position to release the cartridge with the second kind of cartridge being in the player said arm engages said operating rod and moves the same against said spring pressure until said locking means locks said operating rod against said spring pressure to set said mode selector switch in said first position.

6. The cartridge-type tape player of claim 4 wherein said mode selector switch acts to deenergize said solenoid with said mode selector switch being operated to said second position by the release of said spring loaded rod.

* * * * *